United States Patent
Chou (10) Patent No.: US 7,112,312 B2
(45) Date of Patent: Sep. 26, 2006

(54) QUENCH BOX FOR A MULTI-BED, MIXED-PHASE COCURRENT DOWNFLOW FIXED-BED REACTOR

(76) Inventor: Tai-Sheng Chou, 4 Jordan Ct., Cherry Hill, NJ (US) 08003

(*) Notice: Subject to any disclaimer, the term of this patent is extended or adjusted under 35 U.S.C. 154(b) by 897 days.

(21) Appl. No.: 09/824,294

(22) Filed: Apr. 2, 2001

(65) Prior Publication Data

US 2002/0172632 A1   Nov. 21, 2002

(51) Int. Cl.
B01J 8/02 (2006.01)
B01F 3/00 (2006.01)
(52) U.S. Cl. .................. 422/220; 422/194; 422/224
(58) Field of Classification Search .............. 422/220, 422/194, 224
See application file for complete search history.

(56) References Cited

U.S. PATENT DOCUMENTS

| | | | |
|---|---|---|---|
| 2,512,562 A | 6/1950 | Cummings | 23/288 |
| 3,218,249 A | 11/1965 | Ballard | 208/108 |
| 3,524,731 A | 8/1970 | Effron | 23/288 |
| 3,541,000 A | 11/1970 | Hanson | 208/108 |
| 3,824,081 A | 7/1974 | Smith | 23/288 |
| 3,977,834 A | 8/1976 | Alcock | 23/288 |
| 4,126,539 A | 11/1978 | Derr, Jr. | 208/108 |
| 4,126,540 A | 11/1978 | Grosboll | 208/146 |
| 4,138,327 A | 2/1979 | Scott | 208/146 |
| 4,140,625 A | 2/1979 | Jensen | 208/146 |
| 4,235,847 A | 11/1980 | Scott | 422/220 |
| 4,311,671 A | 1/1982 | Notman | 422/148 |
| 4,788,040 A | 11/1988 | Campagnolo | 422/220 |
| 4,792,229 A | 12/1988 | Frohnert | 366/336 |
| 4,836,989 A | 6/1989 | Aly | 422/195 |
| 5,152,967 A | 10/1992 | Rossetti | 422/194 |
| 5,403,561 A | 4/1995 | Koros | 422/195 |
| 5,462,719 A | 10/1995 | Pedersen | 422/195 |
| 5,567,396 A | 10/1996 | Perry | 422/190 |
| 5,635,145 A | 6/1997 | Den Hartog | 422/191 |
| 5,690,896 A | 11/1997 | Stangeland | 422/191 |
| 5,772,970 A | 6/1998 | Okamoto | 422/191 |
| 5,837,208 A * | 11/1998 | Grott et al. | 422/195 |
| 5,935,413 A | 8/1999 | Boyd | 208/49 |
| 5,989,502 A | 11/1999 | Nelson | 422/194 |
| 6,093,373 A | 7/2000 | Darmancier | 422/220 |

OTHER PUBLICATIONS

Chou, Tai-Sheng, *Liquid Distribution in a trickle Bed with Redistribution Screens*, I & EC process Design & Development, 1984.
Milbourn, Cathy, EPA Dramatically Reduces Pollution from Heavy-Duty Trucks and Busses; Cuts Sulfur Levels in Diesel Fuel, Environmental News, 2000.

* cited by examiner

Primary Examiner—Jonathan Johnson
(74) Attorney, Agent, or Firm—Thorpe North & Western LLP (57) ABSTRACT

A compact quench box design for a multi-bed, mixed-phase cocurrent downflow fixed-bed reactor has a quench pipe manifold and nozzle assembly, a collection tray, a mixing chamber, and a single final distributor tray. The quench pipe manifold and nozzle assembly is an annular ring pipe having nozzles arising therefrom. The mixing chamber is an annular compartment depending from the collection tray above having a partition pan, forming a partition weir at its inside diameter for liquid to flow, and a bottom section pan, which forms a vapor outlet weir at its inside diameter for vapor flow onto the final distributor tray below. This design reduces the number of manway required for the quench box.

12 Claims, 11 Drawing Sheets

QUENCH BOX FOR A MULTI-BED, MIXED-PHASE COCURRENT DOWNFLOW FIXED-BED REACTOR

BACKGROUND OF THE INVENTION

1. Field of the Invention

This invention relates to a compact quench box design for multi-bed, mixed-phase, cocurrent downflow fixed-bed reactor.

2. General Background

Reactors used for hydroprocessing of petroleum streams often require multi-bed design. Multi-bed mixed-phase cocurrent downflow fixed bed reactors are commonly used in the refining industry for hydrodesulfurization, hydrodenitrogenation, hydrodewaxing, aromatic saturation, hydrocracking, and hydroisomerization dewaxing reactions. Similarly, exothermic reactions, such as two-phase exothermic chemical reactions, in chemical plant reactors may also require a multi-bed design.

In such multi-bed reactors, a catalyst is provided in a series of two or more vertically spaced beds. The material being treated is introduced at the top of the reactor so it flows downwardly through the beds during treatment. Reaction components may be added at the top of the reactor with the material to be treated and additional reaction components may be added between beds.

As the material being treated moves downwardly from bed to bed, it may be desirable to redistribute liquid components over a bed for more even treatment in each bed, and/or, with exothermic reactions, to cool the reactants between each bed. Quench boxes are commonly used between beds for these purposes. The requirement for a quench box may be driven either by the need for liquid redistribution for improving the contact efficiency between reactants and catalyst or for improving temperature control in the reactor due to the exothermic reactions in the catalytic bed.

Redistribution of Liquid: The desire to design hydroprocessing reactors at reduced pressure drop, which saves capital investment by reducing the size of the recycle compressor, allows the liquid to trickle over the catalyst surface over the cross sectional area of the reactor by gravitational flow. Consequently, liquid tends to flow gradually in non-homogeneous fashion at about ten to fifteen feet down from the distributor. Chou in I&EC Process Design & Development vol, 23, p. 501 (1984) stated that "Since liquid trickles over the catalyst's external surface under gravity, liquid will eventually reach its equilibrium distribution between the wall liquid and the liquid trickling over the catalyst surface. Consequently, a uniform liquid distribution attained near the top of the packed bed does not guarantee a uniform liquid distribution a few feet down the bed." Non-uniform flow of liquid in a catalytic bed affects the efficiency of the catalyst utilization. Therefore, it is common practice in the industry to limit the bed height and to provide flow redistribution quench boxes at a pre-determined maximum bed height for improving catalyst utilization.

Temperature Control: Hydroprocessing reactors or any chemical plant reactors involving highly exothermic reactions, (e.g., olefin saturation, aromatic saturation, hydrodesulfurization, hydrocracking, or hydrodenitrogenation reactions) may require multiple beds for the temperature control, for product quality control, (e.g., color body for diesel product), or for extending the catalyst cycle life. Generally, a stream at a lower temperature, (i.e., quench gas or quench liquid) is used to adjust the temperature in the quench box. Intimate mixing between the quench stream and the hot vapor-liquid reaction two-phase fluid stream (hereinafter, "hot reaction two-phase fluid stream") coming from the bed above at a higher temperature is critical for providing an improved performance in the catalytic bed located below the quench box.

The commonly used quench gas is normally supplied from the discharge side of the recycle compressor located in the process unit. Quench gas injection into the quench box serves several important roles. The quench gas is used to adjust the reactor temperature at the optimal conditions. The quench gas, if hydrogen, supplements the hydrogen depleted from the exothermic reactions in the bed above the quench box. Quench gas addition in the quench box also ensures proper vapor/liquid phase partition in the bed below the quench box to ensure optimal operating conditions.

The United States Environmental Protection Agency (EPA), in announcing its new sulfur content rule of Dec. 21, 2000, stated that "To ensure cleaner-running trucks and buses, today's action also requires that sulfur in diesel fuel be reduced by 97 percent." This new EPA rule sets the sulfur standard in the diesel fuel for on-road vehicles at 15 ppm effective June 2006 as opposed to the present standard of 500 ppm sulfur in diesel fuel. This EPA regulation for the diesel fuel sulfur content provides impetus for the refining industry to search for means to satisfy the requirement of reduced sulfur in diesel fuel while minimizing capital investment. Process revamp (i.e., for a process unit having an existing reactor) to increase the catalyst volume by adding a new multi-bed fixed bed reactor, coupled with the loading of the most advanced high activity catalysts, seems to satisfy the requirement with minimal cost. Consequently, the compact quench box design for the multi-bed, mixed-phase cocurrent downflow fixed-bed reactor allows the refining industry to satisfy this new EPA rule with reduced capital investment for a process revamp or grassroots design (i.e., a new process unit having a new reactor design).

Although voluminous disclosure of quench box design is available in the patent literature, there are still needs to developed a compact quench box design to promote the required intimate mixing between the quench stream and the hot reaction two-phase fluid stream while reducing capital investment or unit down time during turnaround (i.e., catalyst changeout). The savings on reactor height can be used to load an incremental catalyst volume to improve the performance of the reactor or to reduce the total weight or the capital investment of the reactor.

3. Discussion of the Prior Art

Hanson, et al., U.S. Pat. No. 3,541,000, discloses the use of two trays below the mixing chamber for effecting the distribution of vapor and liquid onto the bed below the quench box. Quench gas is introduced below the mixing chamber which reduces the extent of thermal equilibrium achievable for contacting the quench gas with the hot reaction two-phase fluid stream at a low vapor-liquid interfacial surface area. The void space (hereinafter, "voids") between the catalyst support beams is not utilized for quench gas and the hot vapor-liquid reaction two-phase fluid stream contact.

Smith, et al., U.S. Pat. No. 3,824,081, discloses a quench box with mixing device followed by a distributor assembly consisting of one perforated tray and one distributor tray with v-notch downcomers to provide the uniformity of fluid flow onto the bed below. The disclosed design requires excessive reactor height to achieve the required mixing and redistribution. No attempt was made to reduce the quench box height. The redistribution assembly requires two trays to accomplish the desired redistribution of liquid.

Alcock, et al., U.S. Pat. No. 3,977,834, discloses the significance of utilizing the voids between the catalyst support beams for a compact quench box design. While the effective use of the voids between the catalyst support beams for quench gas distribution is novel, the quench gas distribution device disclosed in the patent utilizes a grid to introduce quench gas through perforated pipes. This is an ineffective means for achieving thermal equilibrium between the lower temperature quench stream and the hot reaction two-phase fluid stream when compared to controlled injection of the quench gas. The design according to the disclosed patent does not provide an effective sweeping action of the quench gas onto the hot reaction two-phase fluid stream at a higher temperature. A plurality (from two to ten) of "quench boxes" are used in the disclosed patent, but which will not provide uniformity of temperature distribution from different "quench boxes".

Frohnert, et al., U.S. Pat. No. 4,792,229, discloses the use of a conical collecting plate and a static mixer to achieve desirable mixing. Commercial installation using a design similar to the disclosed patent shows that the use of static mixer requires excessive quench box height to attain desirable mixing. Use of the conical collecting plate also requires greater reactor height than use of a flat collection tray design. Overall, the quench box of the disclosed design requires much greater reactor height than any conventional quench box design equipped with a flat collection tray.

Aly, et al., U.S. Pat. No. 4,836,989, discloses a quench box design similar to that of Hanson in view of the quench box features. However, the disclosed patent has revised the distributor assembly and the quench gas distributor location from those of Hanson. The distributor assembly consists of two trays, a flash pan tray and a final distributor tray. The flash pan tray has perforated plates with liquid passageways and downcomers for vapor passageways. The final distributor has downcomer pipes for effecting the uniformity of fluid distribution onto the bed below the quench box. The quench gas is distributed above the mixing chamber device. The disclosed quench gas distributor requires a bend upward (or could be downward) for the quench gas pipe at the centerline of the reactor. This requires additional reactor height to accommodate the quench gas distributor assembly. The disclosed design does not provide for a compact quench box design in view of the requirement for the bend of the quench pipe at the centerline of the reactor and the two-tray assembly for the distributor system.

Nelson, et al., U.S. Pat. No. 5,989,502, also discloses a quench box design similar to that of Hanson in view of the quench box features. The mixing chamber outlet weir is called an "orifice" in this patent, indicating the intent for the mixing chamber outlet to provide further two-phase interactions. Since vapor and liquid tend to segregate in the mixing chamber, the intended orifice weir outlet design serves little function to promote the interactions between the vapor and liquid phases. This design and the prior art disclosed in Hanson and Aly create an orifice weir outlet for the mixing chamber; this requires an additional manway on the bottom pan of the mixing chamber. The unit turnaround time is extended resulting from the orifice weir outlet design using the disclosed patent and other prior art design.

Grott, et al., U.S. Pat. No. 5,837,208 discloses the quench box design similar to that of Aly and Hanson. The main feature of the design as claimed in the patent is a compact quench box design by providing a rough liquid distributor in additional to the final distributor. In view of the accomplishment with the improved design for the rough liquid distributor, the total saving on the quench box height is still quite limited. Underneath the mixing chamber, the disclosed patent design still requires two distributor trays to provide the flow distribution unto the catalytic bed below the quench box.

Boyd, et al., U.S. Pat. No. 5,935,413 discloses a modified version of Aly and Hanson. Separate mixing chambers are designed for the vapor and liquid phases. After segregation for the two phases and vigorous mixing for the separated phases, the two streams are mixed in the form of thin sheet of liquid impinged by the cooled vapor stream (quench gas is in contact with the vapor phase only in the vapor phase mixing chamber). The drawback of the design based on this patent is its limited thermal equilibrium achievable. The thin sheet of liquid at the outlet of the liquid phase mixing chamber provides very limited interfacial surface area for the heat transfer between the hot liquid and cooled vapor phases. Therefore, the design based on this patent disclosure may not achieve the desirable thermal equilibrium. Two trays underneath the mixing chambers are also required for the fluid redistribution onto the catalytic bed below the quench box.

Rossetti, et al., U.S. Pat. No. 5,152,967, discloses the use of a quench gas pipe that terminates in a centrally located ring sparger that has a plurality of openings. The quench gas distributor is located between the mixing device and the catalyst support mechanisms. The effectiveness of the quench gas to sweep the hot vapor-liquid reaction two-phase fluid stream is limited with this design due to its non-optimal sweeping velocity as a result of the inherent nature of the ring sparger design. The quench mixing device and the distributor assembly in the disclosed design consist of four trays, which require excessive reactor height to accommodate.

The design for the final distributor can take various forms to provide uniform flow of liquid over the catalytic bed below the quench box. Grosboll, et al., U.S. Pat. No. 4,126,540, discloses a downcomer with a side orifice design for the final distributor. Ballard, et al., U.S. Pat. No. 3,218,249, discloses the use of bubble-cap for the final distributor. Jensen, U.S. Pat. No. 4,140,625, discloses the use of venturi-shaped eductor for distributing liquid over the catalytic bed. Effron, et al., U.S. Pat. No. 3,524,731, discloses the use of truncated triangular cutout for the top slots on the downcomer to provide a uniform flow of liquid with varying rate for unit throughput. Smith, et al., U.S. Pat. No. 3,824,081, discloses the use of v-notch downcomer for the final distributor design for achieving uniform flow of liquid onto the catalytic bed. Scott, U.S. Pat. No. 4,235,847, discloses the design of the final distributor for effecting froth flow conditions on the distributor tray. Koros, et al., U.S. Pat. No. 5,403,561, discloses the use of a spray generating device for producing a conical downward spray of mixed phase onto the catalyst bed. The aforementioned types of final distributor designs can be incorporated in this quench box design without sacrificing the significance for a compact quench box design.

SUMMARY OF THE INVENTION

This patent application discloses a compact quench box design for a multi-bed, mixed-phase cocurrent downflow fixed-bed reactor for processing reaction streams in catalytic beds.

This application discloses:

Quench gas nozzles with nozzle outlets located between and parallel to the catalyst bed support beams to provide for a sweeping action injected through and perpendicular to the hot vapor-liquid reaction two-phase fluid stream coming down from the bed above.

A mixing chamber that provides for intimate mixing of the quench gas and hot reaction two-phase fluid stream and the separation of the vapor from the liquid. Vapor coming out of the mixing chamber redistributes radially onto the final distributor tray from the center of the reactor, and liquid coming out of the mixing chamber through drip tubes provides a calming flow onto the final distributor tray. The drip tubes extend from the mixing chamber to the final distributor tray.

The diameter of the weir for the vapor outlet from the mixing chamber is at least twenty-four inches to eliminate the requirement of a manway in the quench box design. The total manway requirement using the design of the instant invention becomes two (on the collection tray and the final distributor tray); this is significantly less that of the prior art designs. As stated, the diameter of the vapor outlet weir for eliminating the manway is at least twenty-four inches. However, the preferred design diameter for the vapor outlet weir should be equal to or greater than thirty inches to accommodate efficient maintenance turnaround.

The distributor assembly is a single tray design, with the use of downcomers with top slots and side orifice. Other types of trays which can be used with this design include bubble caps, downcomers with spray generating devices, downcomers with a v-notch, froth flow distributors, downcomers with truncated triangular cut-out weir, and venturi-shaped eductors, for effecting uniformity of liquid/vapor distribution onto the top of the catalytic bed located below the quench box.

Another feature for the quench distribution design of this application is the location of the quench gas assembly, which is away from the centerline of the reactor. This design eliminates the need to disassemble the quench distributor during the unloading of the catalyst (and re-assemble the quench distributor during loading of the catalyst) for catalyst changeout.

The time required for removing one complete set of manways and the quench gas distributor assembly in one quench box based on the prior art design during the unloading of catalyst under inert environment is estimated at twelve hours depending on the efficiency of the catalyst contractor. The implementation of the present invention reduces the estimated time required for manway removal (quench gas distributor removal is not necessary) from twelve to four hours, resulting from the reduced number of manways, the ease of manway removal using this design, and the improved design for the quench gas distributor assembly in the quench box eliminating the need to remove the quench gas distributor assembly for catalyst changeout.

Ramps are incorporated on the collection tray. The function of the ramps is to provide for radial mixing of the streams in the mixing chamber. Consequently, the arrangement for the ramps has to induce unidirectional flow for the streams from the collection tray into the mixing chamber. This is accomplished through the imposed flow direction for the streams at the entrance to the ramps. The ramp design of the instant invention is similar to that disclosed in Hanson. However, any variation for the ramp design, (e.g., Nelson,) which imposes an effective radial mixing in the mixing chamber, can be incorporated in this application without sacrificing the benefits of a compact quench box design of this application. Another unique feature of the quench box design of this application is the use of drip tubes on the bottom pan of the mixing chamber.

Drip tubes located at points generally on the circumference of a diameter, which is $1/\sqrt{2}$ or 0.7071 times the reactor inside diameter, direct the liquid onto the final distributor flowing in a calm fashion.

The disclosed invention describes a compact quench box design for multi-bed, mixed-phase cocurrent downflow fixed-bed reactors to reduce the capital investment for a grassroots reactor design or to improve the feasibility for revamping an existing reactor with limited available quench box height. The disclosed design also promotes thermal equilibrium attainable between the quench stream and the hot reaction two-phase fluid stream coming from the bed above the quench box.

BRIEF DESCRIPTION OF THE DRAWINGS

The best mode presently contemplated for carrying out the invention in actual practice is shown in the accompanying drawings, in which.

DETAILED DESCRIPTION OF THE ILLUSTRATED EMBODIMENT

Figure 1:
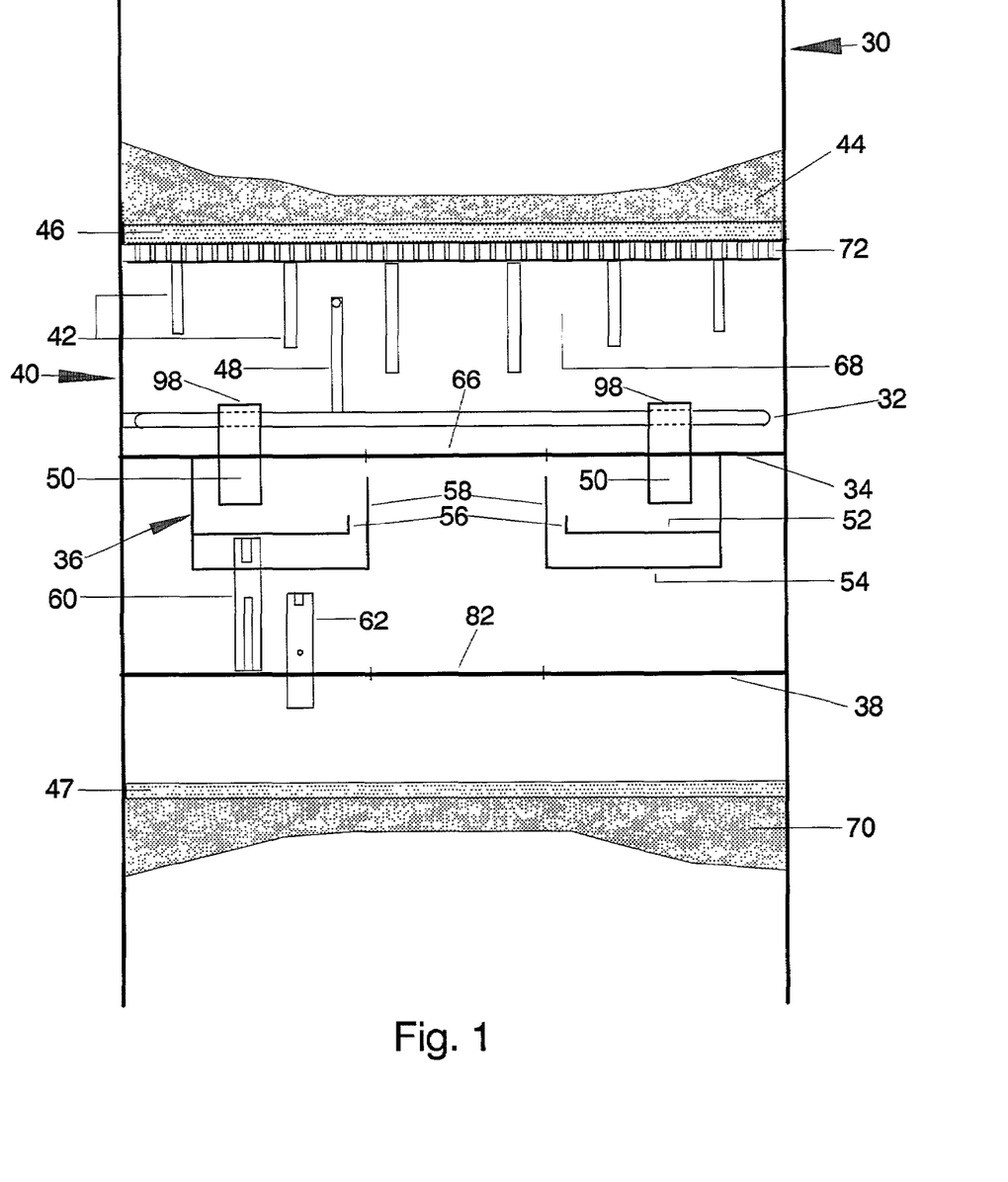
FIG. 1 is a schematic elevation of a partial section of a reactor showing a quench box.
Figure 2:
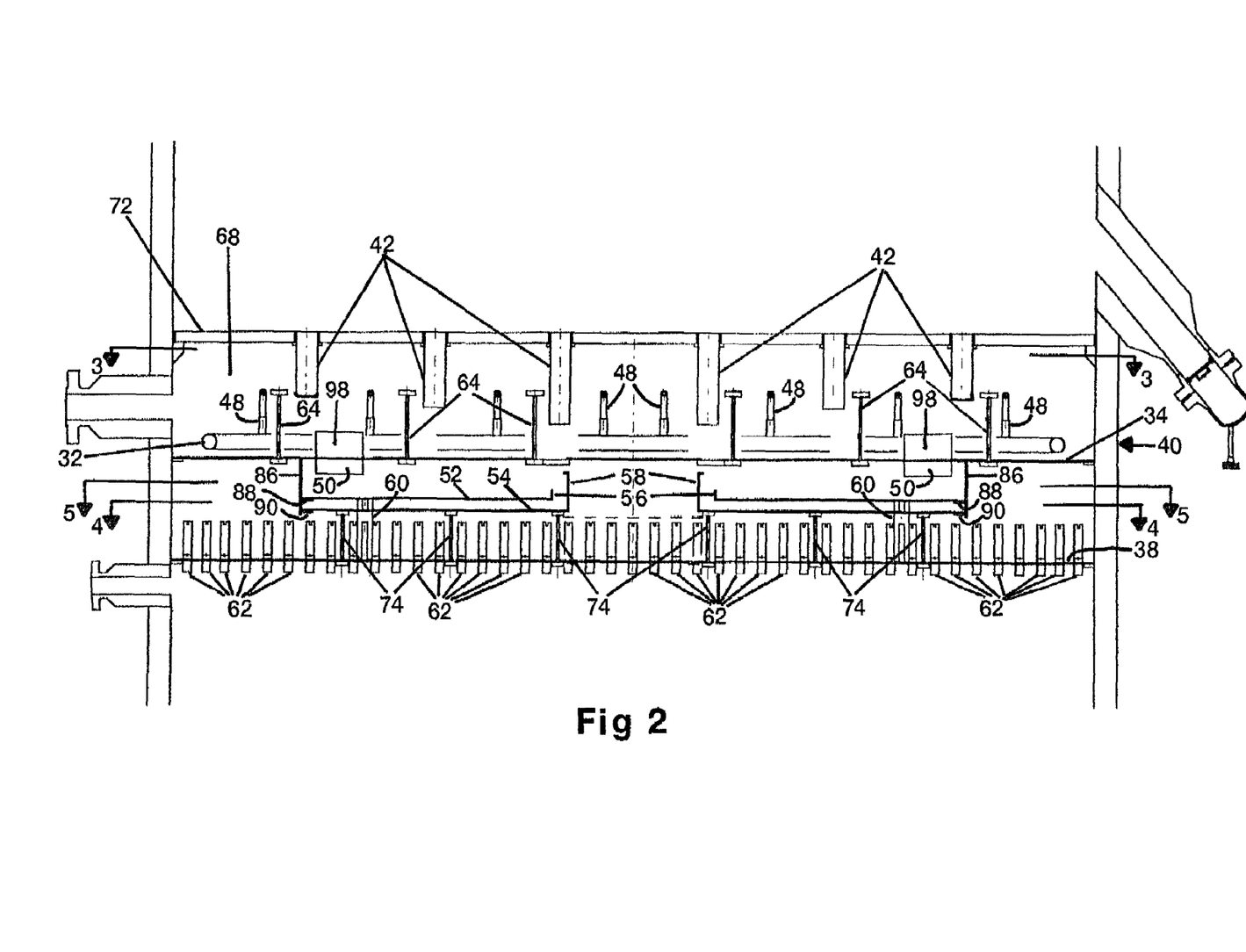
FIG. 2 is a front elevation of the quench box of FIG. 1.

A quench box design for a multi-bed, mixed-phase cocurrent downflow fixed-bed reactor 30 as contemplated by the invention, includes a quench pipe manifold and nozzle assembly (hereinafter, "quench pipe assembly") 32, a collection tray 34, a mixing chamber 36, and a single final distributor tray 38, as shown in FIGS. 1 and 2. The quench box 40 is a section of the reactor 30 between vertically spaced catalyst beds in which a cooling quench gas, usually hydrogen, is introduced to and mixed with a hot reaction two-phase fluid stream, FIGS. 1 and 2.

Figure 8:
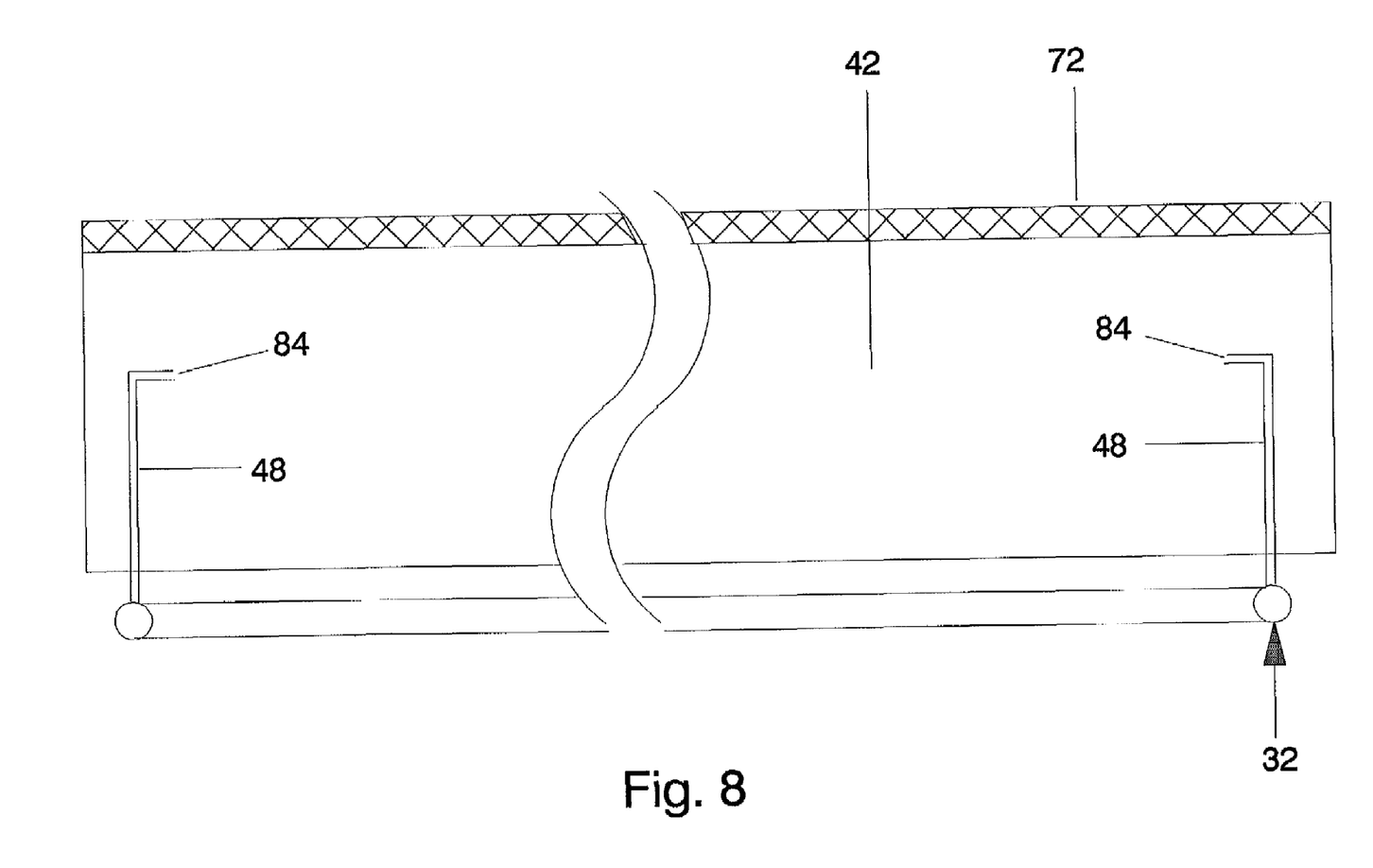
FIG. 8 is a partial side elevation of the void space above the quench pipe manifold and nozzle assembly.

The hot reaction two-phase fluid stream flows from the bottom portion 44 of a catalyst bed above the quench box 40, FIG. 1. The top portion 70 of a catalyst bed would be situated below the quench box 40. It should be understood that a catalyst bed is a uniform medium of packed catalyst particles having a top portion and bottom portion designated for purposes of description, both being part of the same uniform medium shown in FIG. 1 as the bottom portion 44 of the catalyst bed above the quench box and top portion 70 of the catalyst bed below the quench box. The catalyst bed 44 lies on top of a catalyst support grid 72 between which is an inert layer 46, FIG. 1, the inert layer typically being alumina or silica-alumina. The catalyst support grid 72 is supported by catalyst support beams 42, FIGS. 1, 2, and 8. Below the catalyst support beams 42 and above the collection tray 34 is situated the quench pipe assembly 32, FIGS. 1 and 2. A void space (hereinafter, "voids") 68 lies between the catalyst support beams 42 and above the quench pipe assembly 32, FIGS. 1 and 2.

Figure 3:
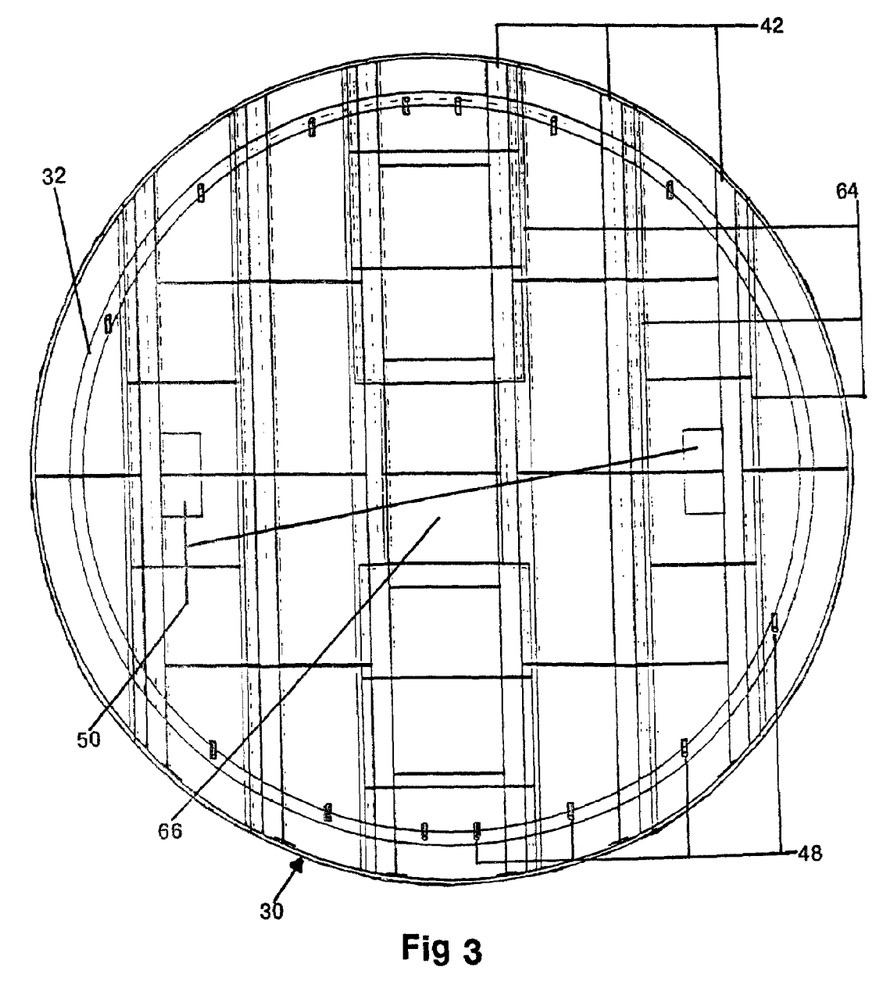
FIG. 3 is a section showing the collection tray taken along 3—3 of FIG. 2.

Quench gas is supplied from the quench pipe assembly 32 through the nozzles 48 thereof by injection into the hot reaction two-phase fluid stream which comes down from the catalyst bed 44 above the quench box 40 through the catalyst support grid 72 as a sprayed mist of vapor and fine liquid droplets between the catalyst support beams 42, FIGS. 1 through 3. The sprayed mist of vapor and fine liquid droplets results from the shearing of liquid trickling flowing as a film over the catalyst surface and high velocity of vapor through the interstitial space between the particles of the catalyst at the bottom of the catalyst bed 44. The outlet 84, FIG. 8, of the quench gas nozzles 48 are aligned parallel to the catalyst support beams 42 to fully utilize the voids 68 between the catalyst support beams 42. Quench gas is injected from quench gas nozzles 48 through nozzle outlets 84 perpendicular to the downward flow of the hot reaction two-phase fluid stream, FIG. 8, at an exit velocity of fifteen to thirty-five feet per second to provide a sweeping action resulting in a cooled mixed two-phase fluid stream, FIGS. 1 through 3, and 8. It should be understood that the downward flow of the reaction fluid stream is considered to be in a vertical direction perpendicular to the catalyst support grid 72 above. The exit velocity of the quench gas is controlled by the design of the quench gas pipe assembly. The quench gas nozzle inside diameter, coupled with the number of quench gas nozzles, and the quench gas flow rate determine the exit velocity of the quench gas. The quench gas flow rate is controlled by adjusting an inlet control valve, not shown. This quench gas injection design attains optimal contact of the quench gas with the hot reaction two-phase fluid stream in order to approach thermal equilibrium.

The quench pipe assembly 32 is located away from the centerline of the reactor, FIG. 3, to eliminate the need to disassemble the quench pipe assembly 32 during unloading the catalyst and then re-assemble the quench pipe assembly 32 after catalyst changeout.

The collection tray 34 is fitted with ramps 50 to provide fluid communication bringing the cooled mixed two-phase fluid stream from the collection tray 34 into the mixing chamber 36 below (i.e., flow of the cooled mixed two-phase fluid stream onto the mixing chamber below), FIGS. 1 through 3. As another embodiment of ramps, overhead chutes 98, FIGS. 1, 2, 11, and 12, can be incorporated with ramps for directing the flow of vapor of the two-phase fluid stream from the collection tray onto the mixing chamber below at an increased velocity. The collection tray 34 is held in place by lattice beams 64 secured to the sides of the quench box 40, FIGS. 2 and 7. The collection tray 34 has a manway 66, FIGS. 1 and 3, to provide access through the quench box 40 during catalyst changeout.

The arrangement of the ramps 50 on the collection tray 34 is adapted to provide radial mixing of the cooled mixed two-phase fluid stream as it spills onto the mixing chamber 36, FIGS. 1 and 3. Consequently, the arrangement of the ramps has to induce unidirectional flow for the cooled mixed two-phase fluid stream from the collection tray 34 onto the mixing chamber 36 below, FIGS. 1 and 3. After intimate contact between the quench gas and the hot reaction two-phase fluid stream, the collection tray with the ramp design allows the cooled mixed two-phase fluid stream to enter the mixing chamber tangentially with a swirling action.

Figure 4:
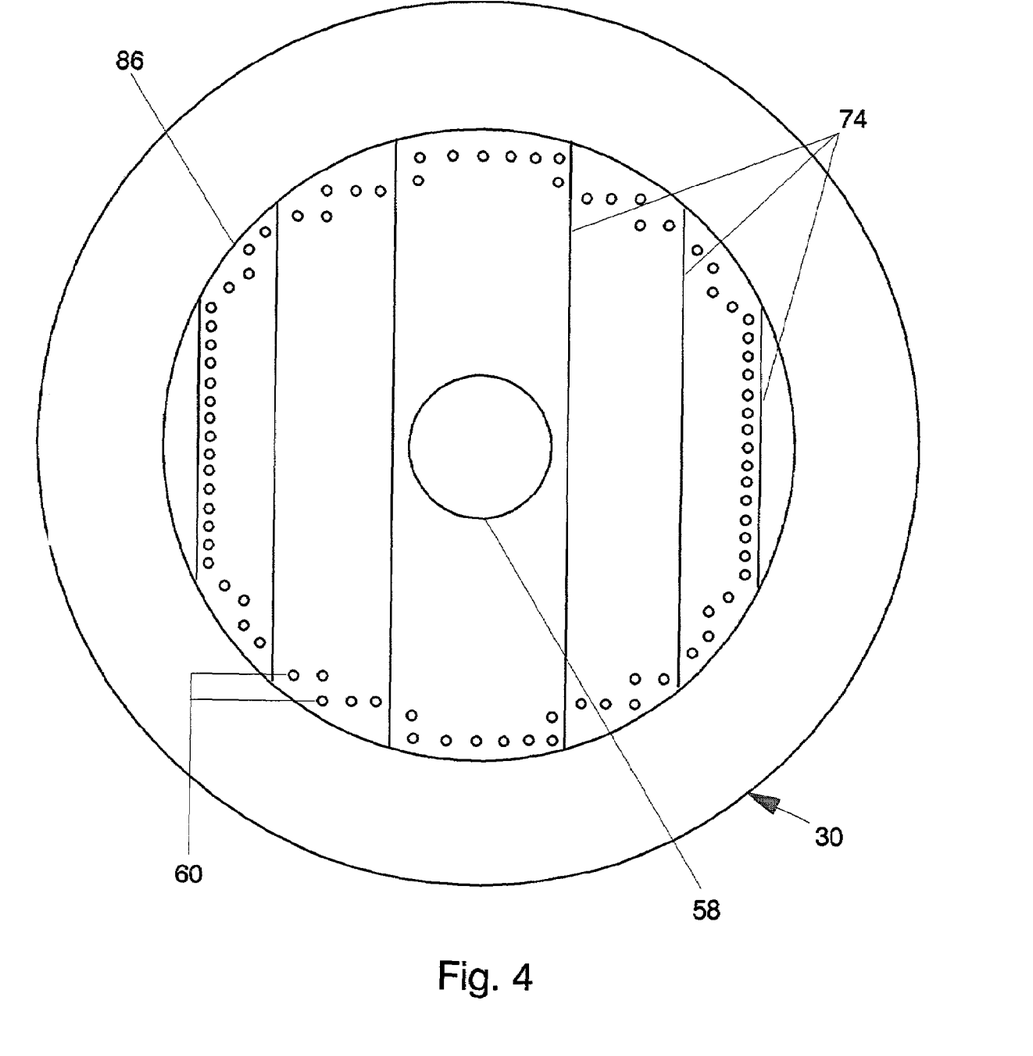
FIG. 4 is a section showing the bottom section pan of mixing chamber taken along 4—4 of FIG. 2.
Figure 5:
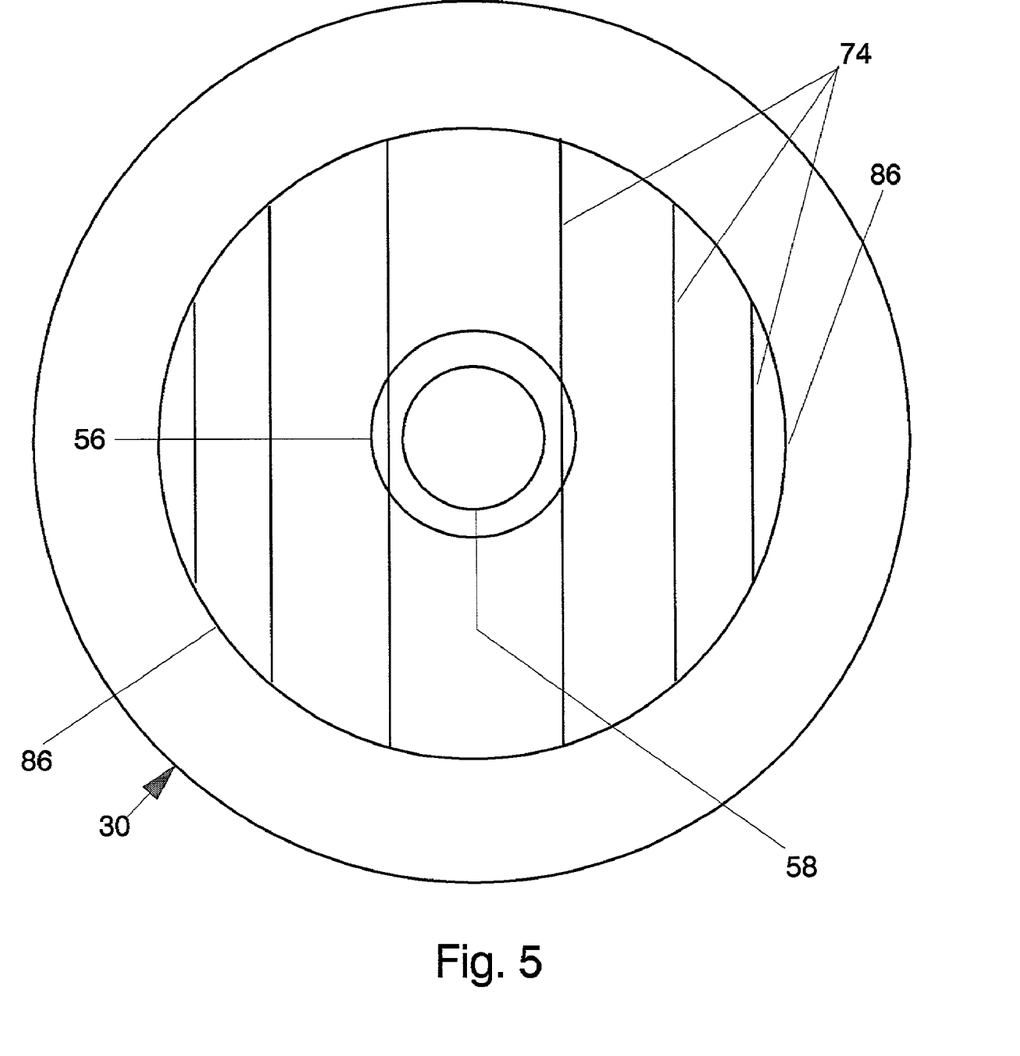
FIG. 5 is a section showing the partition pan of mixing chamber taken along 5—5 of FIG. 2.
Figure 6:
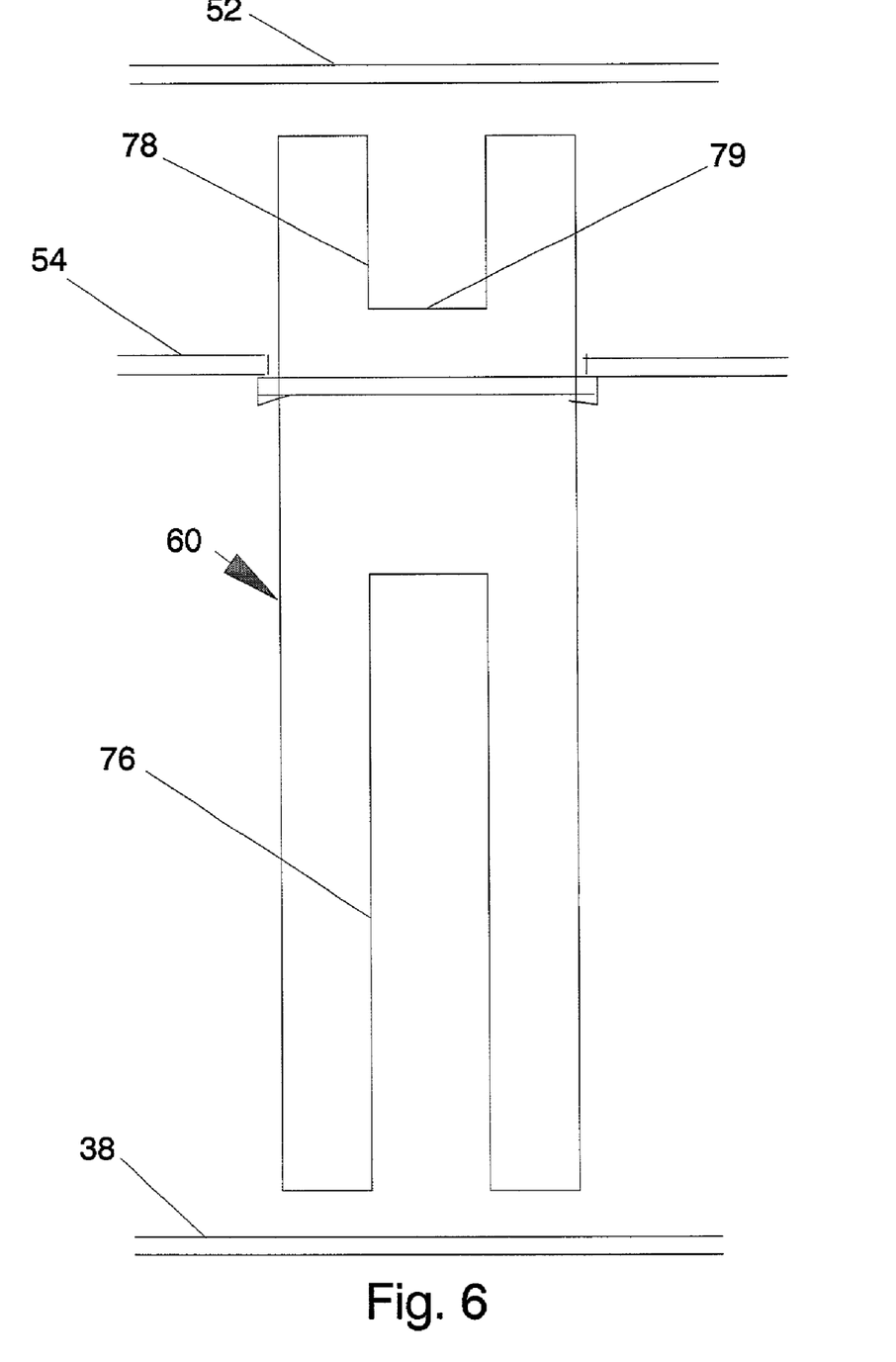
FIG. 6 is an elevation of a drip tube.
Figure 7:
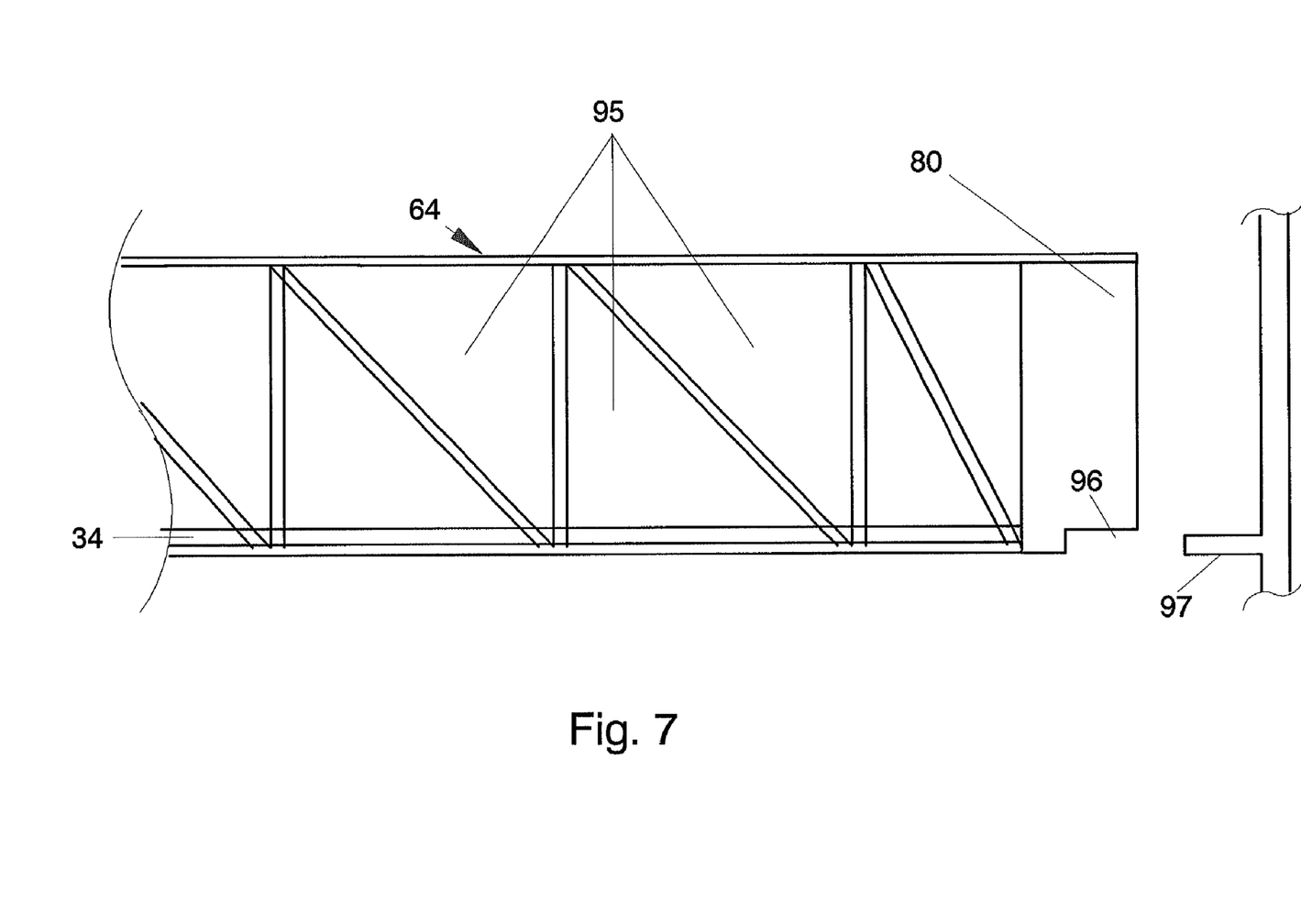
FIG. 7 is an elevation of a lattice support beam for the collection tray with the reactor wall shown in exploded view.

The mixing chamber 36 comprises an annular compartment, depending from the collection tray 34 above, having a partition pan 52 and a bottom section pan 54, FIGS. 1 and 2. A cylinder 86 attached to the collection tray 34 above forms the outer circumference of the mixing chamber 36, FIGS. 2, 4, and 5. The outer circumference of the cylinder has a diameter of at least $1/\sqrt{2}$ or 0.7071 times the inside diameter of the reactor. The upper end of the cylinder forms a lip, not shown, which is bolted to the collection tray to hold the cylinder in place. A ring support 88 welded to the inner circumference of the cylinder 86 provides support for the partition pan 52, FIG. 2. The outer diameter of the partition pan is held onto the ring support by means of conventional bolts or by J-bolts, not shown. A ring support 90 welded to the inner circumference of the cylinder 86 at or near the lower end thereof provides support for the bottom section pan 54, FIG. 2. The outer diameter of the bottom section pan is also held onto the ring support by means of conventional bolts or by J-bolts, not shown. Both the partition pan 52 and the bottom section pan 54 are also supported by lattice support beams 74, FIGS. 2 and 10, secured to the sides of the quench box 40. The partition pan 52 forms a partition weir 56 at its inside diameter over which liquid of the cooled mixed two-phase fluid stream flows onto the bottom section pan 54, FIGS. 1, 2, and 5. The bottom section pan 54 forms a vapor outlet weir 58 at its inside diameter for directing flow of the vapor portion of the cooled mixed two-phase fluid stream onto the final distributor tray 38 below, FIGS. 1, 2, and 4. The bottom section pan 54 has drip tubes 60 which extend to the final distributor tray 38 for directing liquid from the bottom section pan 54 onto the final distributor tray 38 below, FIGS. 1, 2, 4, and 6. Drip tubes 60 include top slots 78 and bottom slots 76. Top slots 78 extend downwardly from the top of drip tubes 60 to a base 79, FIG. 6; this allows liquid to flow into drip tubes 60 before such liquid level reaches the top of drip tubes 60. At this point, vapor has already been separated from the liquid of the cooled mixed two-phase fluid stream. Lattice support beams 74 which support the pans of the mixing chamber and the final distributor tray is secured to the sides of the quench box 40, FIGS. 2 and 10. Lattice support beams 64 are used for securing the collection tray as shown in FIG. 7. It should be understood that the collection tray 34 is made up of several plates supported by the lattice support beams 64; however, for purposes of illustration, the collection tray 34 is shown as one contiguous piece of material in FIG. 7. Open space 95 between lattice beams 64 represents greater than 80 percent of the cross sectional area of the lattice support beams, FIG. 7. In order to hold lattice support beams in place, a ring support 97 is welded to the inside diameter of the quench box, FIG. 7. It should be understood that the "reactor wall" is synonymous with the "inside diameter of the quench box" there being a multiplicity of quench boxes within a reactor. Lattice beams 64 are secured by positioning them such that grooves 96 of end plates 80 fit over said ring support, shown in FIG. 7.

Figure 10:
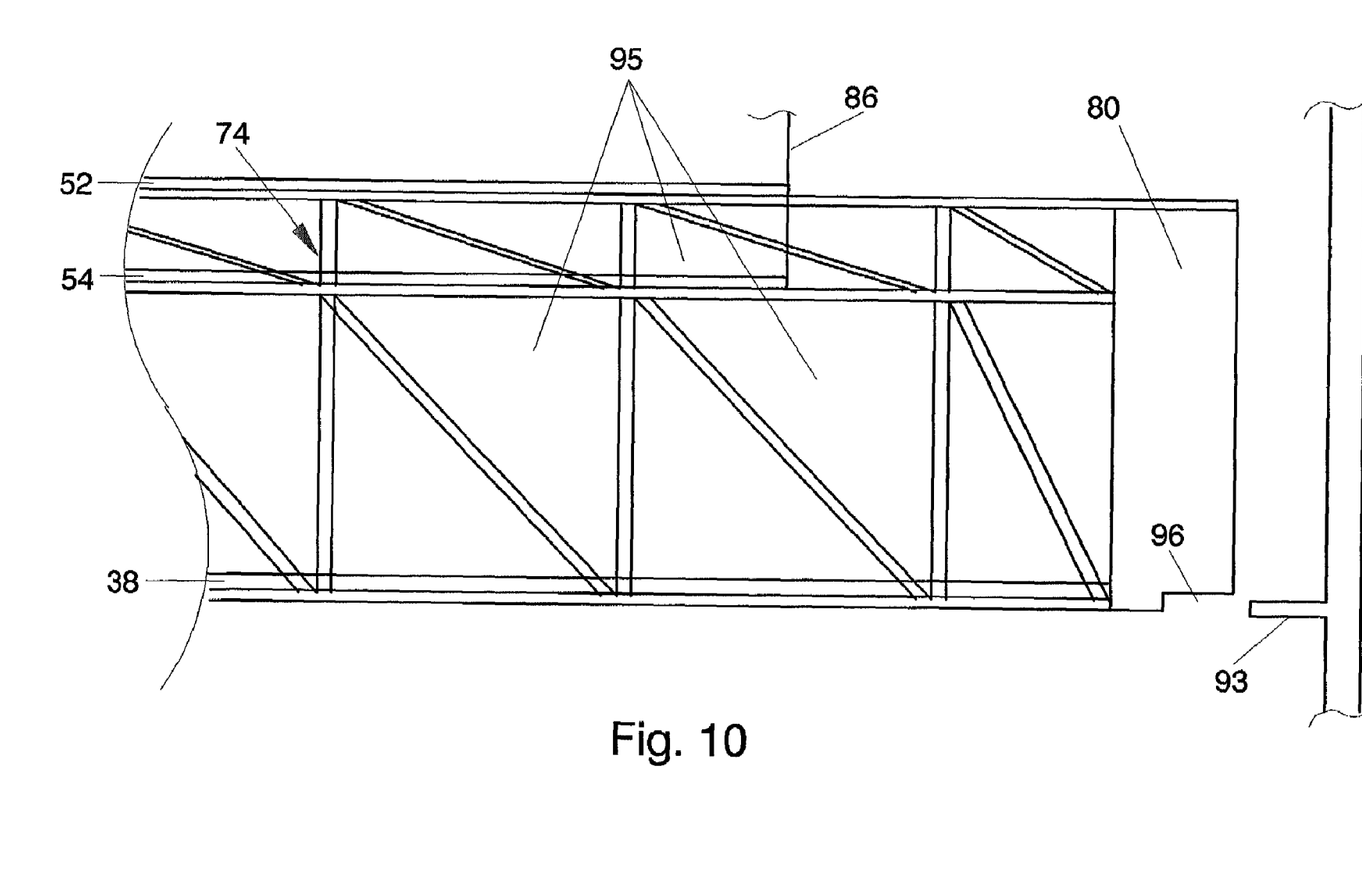
FIG. 10 is an elevation of a lattice support beam for the final distributor tray and the pans of the mixing chamber with the reactor wall shown in exploded view.
Figure 11:
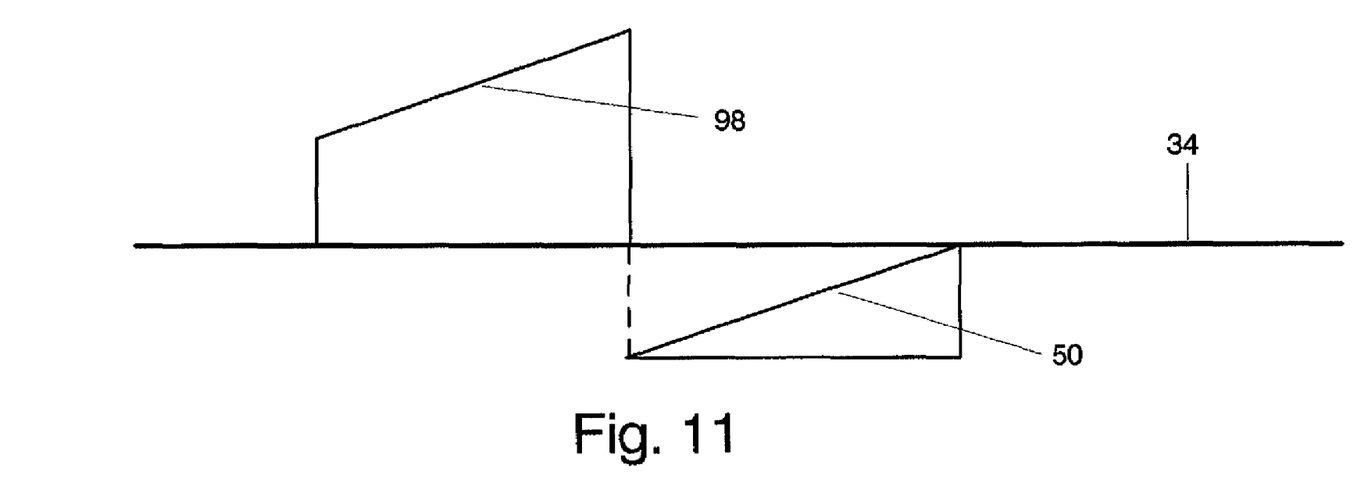
FIG. 11 is an elevation of a ramp with an overhead chute on the collection tray.
Figure 12:
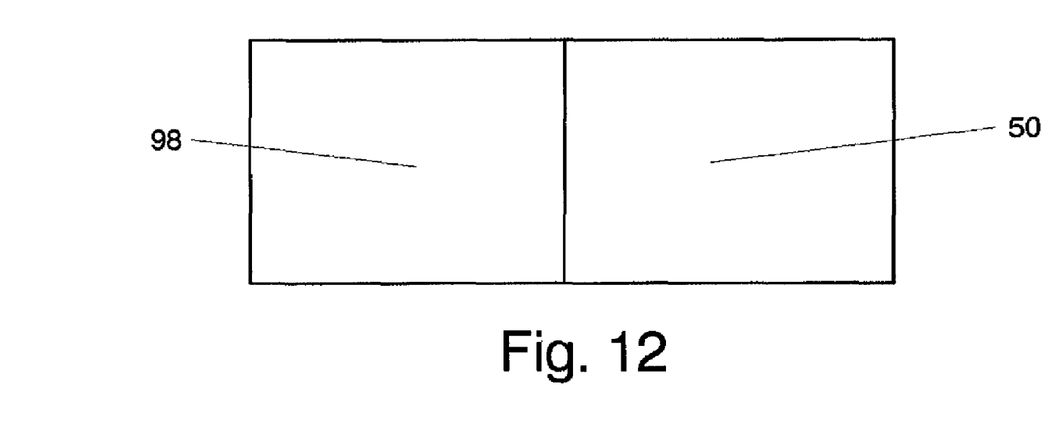
FIG. 12 is a plan view of the ramp with the overhead chute on the collection tray.

Lattice support beam 74 used for securing the final distributor tray 38 and pans 52 and 54 of the mixing chamber is shown in FIG. 10. It should be understood that the final distributor tray 38, the partition pan 52, and the bottom section pan 54 of the mixing chamber 36 are each made up of several plates supported by the lattice support beam 74;

however, for purposes of illustration, the final distributor tray 38, the partition pan 52, and the bottom section pan 54 are each shown as contiguous pieces of material in FIG. 10. Open space 95 provides greater than 80 percent of the cross sectional area of the lattice support beams 74, FIG. 10. Grooves 96, FIG. 10, of end plates 80 secure the lattice support beam to another ring support 93, welded to the inside diameter of the quench box, FIG. 10.

The two-phase fluid mixture comes down from the collection tray 34 in a swirling motion onto the partition pan 52 of the mixing chamber 36 as a result of arrangement of the ramps 50 on the collection tray. Since the enthalpy of the two-phase mixture is contained predominantly in the liquid phase, it is critical to ensure sufficient liquid residence time in the mixing chamber 36 to eliminate any non-uniformity of the temperature in the liquid phase. The design for the mixing chamber according to the instant invention requires that the liquid residence time (hereinafter, "LRT") in the mixing chamber be greater than one second. Liquid residence time in the mixing chamber is defined as the total liquid holdup in the mixing chamber divided by the liquid flow rate per second, $L_m$. Total liquid holdup in the mixing chamber is the sum of the liquid holdup on the partition pan 52 and the liquid holdup on the bottom section pan 54. Liquid holdup on the partition pan 52, $H_p$, is the volume of the liquid above the partition weir 56 plus the liquid contained in the partition pan within the height of partition weir 56. Liquid holdup on the bottom section pan 54, $H_b$, is the volume of the liquid in the bottom section pan 54 above the base 79 of the top slots 78 of the drip tubes 60 and the liquid within the height of the base of the top slots of the drip tubes. Therefore, $LRT=(H_p+H_b)/L_m$. To satisfy the requirement that LRT be greater than one second, the diameter of the outer cylinder 86 of the mixing chamber along with the diameter of the vapor outlet weir 58 of the mixing chamber 36 must be designed to satisfy this condition. In addition the diameter of the vapor outlet weir 58 of the mixing chamber 36 must be at least twenty-four inches.

Representative liquid residence times (LRT) are calculated as follows:

$L_m$=3.075 ft³/sec

Reactor inside diameter=18 ft

Dimensions of the mixing chamber—
    Diameter of the outer cylinder=155.5 in
    Diameter of the partition pan weir=38.5 in
    Weir height of the partition pan weir=2 in
    Diameter of the vapor outlet weir=30 in
    Number of drip tubes=82
    Number of top slots per drip tube=4
    Slot width for the top slots=1.25 in
    Height of the top slot base above bottom section pan=0.24 in Liquid height above the partition weir or the base of the top slots on the drip tubes can be calculated based on—Liquid rate in gallons per minute=$2.787 \cdot w \cdot h^{1.5}$, where w=total width of slots or the length of the partition weir. Therefore, the liquid heights above the partition weir and the base of the top slots on the drip tubes become 2.56 in and 1.13 in, respectively.

Additionally, $$LRT=\pi/4 \times \{[(155.5^2-38.5^2) \times 4.56]+[(155.5^2-30^2) \times 1.37]\}/\{3.075 \cdot 12^3\}=20.0 \text{ seconds}$$

This example describes the calculation for the Liquid Residence Time, LRT, for a reactor having an eighteen ft inside diameter. The LRT should have a minimum of one second to satisfy the required uniformity of liquid temperatures at the exit of the mixing chamber. LRT for other examples follow:

Example for Calculating the Liquid Residence Time (LRT) in Mixing Chamber

Case 1: 18 feet inside diameter reactor, low pressure drop revamp

Case 2: 9 feet inside diameter reactor; grassroots installation with liquid flux at 1.5 times that of case 1

Case 3: 6 feet inside diameter reactor, grassroots installation with liquid flux at 1.5 times that of case 1

Case 4: Case with LRT of less than 1 second, 6 feet diameter reactor

| Parameters | Case 1 | Case 2 | Case 3 | Case 4 |
| --- | --- | --- | --- | --- |
| Reactor inside diameter, feet | 18.00 | 9.00 | 6.00 | 6.00 |
| Liquid flow rate, ft³/s | 3.08 | 1.15 | 0.51 | 0.51 |
| Mixing chamber dimension | | | | |
| Diameter of outer cylinder, inches | 155.50 | 77.75 | 51.83 | 36.00 |
| Diameter of partition pan weir, inches | 38.50 | 38.50 | 38.50 | 32.00 |
| Weir height of partition pan, inches | 2.00 | 1.00 | 0.75 | 0.75 |
| Diameter of vapor outlet weir, inches | 30.00 | 30.00 | 30.00 | 26.00 |
| Number of drip tubes | 82.00 | 42.00 | 28.00 | 28.00 |
| Number of top slots per drip tube | 4.00 | 4.00 | 4.00 | 4.00 |
| Slot width for the top slots on drip tube, inches | 1.25 | 1.25 | 1.25 | 1.25 |
| Height of the top slot base above top of the bottom section pan, inch | 0.24 | 0.24 | 0.24 | 0.24 |
| Liquid height above the partition weir, inches | 2.56 | 1.33 | 0.78 | 0.88 |
| Liquid height above the base of the top slot on bottom section pan, inch | 1.13 | 0.92 | 0.70 | 0.70 |
| LRT in mixing chamber, seconds | 20.03 | 6.55 | 3.12 | 0.91 |

Cases 1 through 3 represent acceptable designs for the mixing chamber with an LRT of greater than one second. The design based on case 4 may result in a non-uniform temperature for the liquid phase. The non-uniformity for the temperature cascades through drip tubes and the final distributor to the catalyst bed 70 below the quench box resulting in poor performance.

Below the mixing chamber 36 is the final distributor tray 38, FIGS. 1 and 2. The final distributor tray 38 has downcomer pipes 62 to direct flow of the cooled mixed two-phase fluid stream to a catalyst bed 70 below the quench box 40, FIG. 1. A shallow layer of inert material (typically alumina or silica-alumina) 47, located on top of catalyst bed below the quench box, is commonly used as a holddown material to prevent the catalyst from moving in the event of pressure disturbances, FIG. 1. The final distributor tray 38 has a manway 82, FIG. 1, to provide access through the quench box 40 during catalyst changeout.

Segregation of vapor and liquid components of the cooled mixed two-phase fluid stream in the mixing chamber is accomplished by gravity, not shown. The vapor component flows over the mixing chamber vapor outlet weir 58 and redistributes from the center of the reactor vessel 30 to the whole cross sectional area of the final distributor tray 38 below, FIG. 1. Liquid on the partition pan 52 of the mixing chamber 36 flows over partition weir 56 and flows downwardly onto the bottom section pan 54 of the mixing chamber 36, FIGS. 1, 2, 4, and 5. Drip tubes 60 are located at points generally on the circumference of a diameter, which is $1/\sqrt{2}$ or 0.7071 times the reactor inside diameter, to direct the liquid flow from the bottom section pan 54 onto the final distributor 38 in a calm fashion, FIG. 4. The area inside the location of the drip tubes is approximately equal to the area outside the location of the drip tubes within the cross section of the reactor; this creates calm liquid flow which can then distribute itself evenly on the final distributor tray. Drip tubes 60 have top slots 78 and bottom slots 76 as shown in FIG. 6. Drip tubes 60 may be welded or bolted to the bottom section pan 54 of the mixing chamber 36, FIG. 6, and extend below almost to the final distributor tray 38. Drip tubes 60 are located between the downcomer pipes 62 of the final distributor tray 38, not shown.

Another feature of the invention is the physical shape and position for the vapor outlet weir 58 of the mixing chamber 36, FIGS. 1, 2, 4, and 5. The inside diameter of the bottom section pan 54 at the vapor outlet weir 58 is equal to or greater than twenty-four inches. This eliminates the requirement for a manway. However, the preferred inside diameter for the vapor outlet weir is at least thirty inches to accommodate efficient maintenance turnaround during catalyst changeout.

Figure 9:
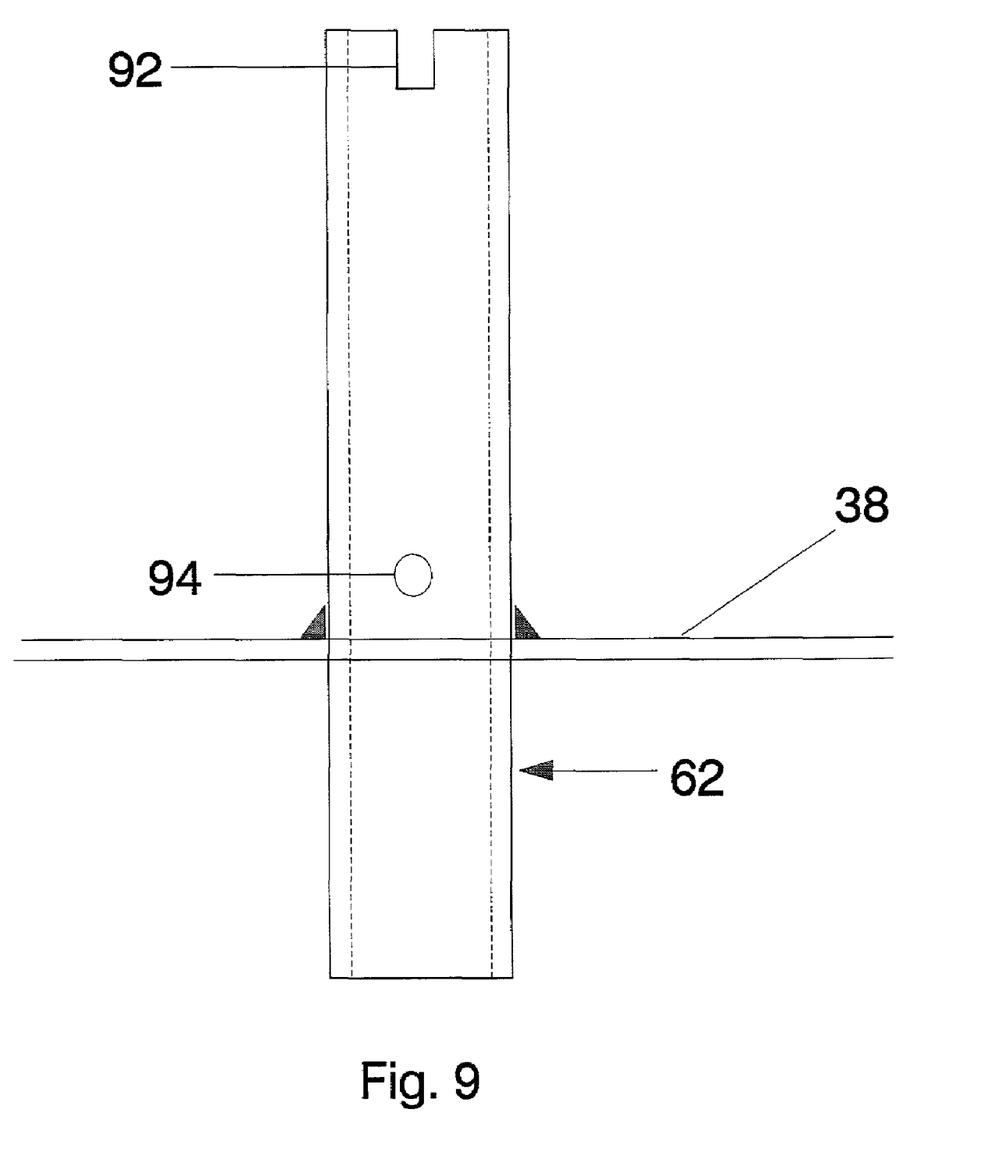
FIG. 9 is an elevation of a downcomer pipe on the final distributor tray.

The final distributor tray 38 is provided with downcomer pipes 62 to provide uniform distribution of liquid and vapor on the catalytic bed below the quench box 40, FIGS. 1 and 2. Downcomer pipes with top slots and side orifices, with bubble caps, with spray devices, with v-notch slots, with truncated triangular cutout weir, and with venturi-shaped educator can also be incorporated in the design of the final distributor tray, not shown. A downcomer pipe 62 with top slots 92 and side orifice 94 is shown in FIG. 9.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

The invention claimed is:

1. A quench box for a multi-bed, mixed-phase cocurrent downflow fixed-bed reactor, comprising:
    a quench pipe manifold and nozzle assembly;
    a collection tray having a manway and located below the quench pipe manifold and nozzle assembly for receiving fluid from a catalyst bed above the collection tray;
    a final distributor tray for distributing fluid to a catalyst bed below the distributor tray, said distributor tray having a manway; and
    a mixing chamber located between the collection tray and the final distribution tray and in fluid communication with the collection tray to receive a two-phase fluid stream flowing therefrom, said mixing chamber including:
        an annular compartment depending from the collection tray above and having a partition pan and a bottom section pan,
        said partition pan having a partition weir at its inside diameter over which liquid flows onto the bottom section pan, and
        said bottom section pan having a vapor outlet weir at its inside diameter, which inside diameter is less than the inside diameter of the partition weir, for vapor flow onto the final distributor tray below and having drip tubes extending to the final distributor tray below, said drip tubes having top slots and bottom slots for directing liquid flow onto said final distributor tray.

2. A quench box for a multi-bed, mixed-phase cocurrent downflow fixed-bed reactor, according to claim 1, wherein the quench pipe manifold and nozzle assembly is an annular ring pipe manifold having nozzles arising therefrom, said nozzles having nozzle outlets located between catalyst support beams supporting the catalyst bed above the manifold and nozzle assembly and in which the direction of flow from outlets of said nozzles is parallel with said catalyst support beams.

3. A quench box for a multi-bed, mixed-phase cocurrent downflow fixed-bed reactor, according to claim 2, wherein the annular ring pipe of the quench pipe manifold and nozzle assembly is located away from the centerline of the reactor.

4. A quench box for a multi-bed, mixed-phase cocurrent downflow fixed-bed reactor, according to claim 2, wherein each quench gas nozzle is configured such that quench gas flowing therefrom has an exit velocity between fifteen and thirty-five feet per second.

5. A quench box for a multi-bed, mixed-phase cocurrent downflow fixed-bed reactor, according to claim 2, wherein the collection tray has ramps extending therethrough for directing flow of a two-phase fluid stream from the collection tray into the mixing chamber below.

6. A quench box for a multi-bed, mixed-phase cocurrent downflow fixed-bed reactor, according to claim 5, wherein the ramps through the collection tray have overhead chutes for directing vapor flow of the two-phase fluid stream from above into the mixing chamber below.

7. A quench box for a multi-bed, mixed-phase cocurrent downflow fixed-bed reactor, according to claim 1, wherein the drip tubes are located generally in a ring with a diameter of $1/\sqrt{2}$ or 0.7071 times the inside diameter of the reactor.

8. A quench box for a multi-bed, mixed-phase cocurrent downflow fixed-bed reactor, according to claim 1, wherein the diameter of the vapor outlet weir is at least twenty-four inches.

9. A quench box for a multi-bed, mixed-phase cocurrent downflow fixed-bed reactor, according to claim 8, wherein the diameter of the vapor outlet weir is at least thirty inches.

10. A quench box for a multi-bed, mixed-phase cocurrent downflow fixed-bed reactor, according to claim 1, wherein the liquid residence time in the mixing chamber is at least one second.

11. A quench box for a multi-bed, mixed-phase cocurrent downflow fixed-bed reactor, according to claim 1, wherein a cylinder forms the outer circumference of the pans of the mixing chamber having a diameter of at least $1/\sqrt{2}$ or 0.7071 times the inside diameter of the reactor.

12. A quench box for a multi-bed, mixed-phase cocurrent downflow fixed-bed reactor, according to claim 1, wherein the mixing chamber has an open central portion substantially aligned with the central manway in the collection tray and large enough for a person to pass therethrough, and wherein the final distributor tray manway is a central manway.

* * * * *